US010354081B1

(12) United States Patent
Jiang et al.

(10) Patent No.: US 10,354,081 B1
(45) Date of Patent: Jul. 16, 2019

(54) PROTECTION OF INTERPROCESS COMMUNICATIONS IN A COMPUTER

(71) Applicant: Trend Micro Incorporated, Tokyo (JP)

(72) Inventors: Chuan Jiang, Nanjing (CN); Weichao Dai, Nanjing (CN); Zhifeng Du, Nanjing (CN); Yuncao Tian, Nanjing (CN); Sen Jiang, Nanjing (CN)

(73) Assignee: TREND MICRO INCORPORATED, Tokyo (JP)

( * ) Notice: Subject to any disclaimer, the term of this patent is extended or adjusted under 35 U.S.C. 154(b) by 197 days.

(21) Appl. No.: 15/398,969

(22) Filed: Jan. 5, 2017

(51) Int. Cl.
*G06F 21/62* (2013.01)
*G06F 21/56* (2013.01)
*H04L 9/32* (2006.01)
*G06F 9/54* (2006.01)

(52) U.S. Cl.
CPC ............ *G06F 21/6209* (2013.01); *G06F 9/54* (2013.01); *G06F 9/545* (2013.01); *G06F 21/562* (2013.01); *H04L 9/3247* (2013.01)

(58) Field of Classification Search
CPC .......... G06F 9/54; G06F 9/545; G06F 21/562; G06F 21/00; G06F 11/00; G06F 21/02; H04L 9/3247; H04L 9/00
USPC ........ 719/313; 713/165, 193, 167, 156, 175; 726/24, 25, 26, 27; 707/783; 717/177
See application file for complete search history.

(56) References Cited

U.S. PATENT DOCUMENTS

| 8,239,674 | B2* | 8/2012 | Lee ...................... G06F 21/6218 713/165 |
| 8,505,101 | B1* | 8/2013 | Lee ...................... G06F 21/564 726/22 |
| 9,027,031 | B2* | 5/2015 | Wilkinson ............. G06F 9/544 707/783 |
| 2006/0236100 | A1* | 10/2006 | Baskaran ................ G06F 21/51 713/165 |
| 2016/0359859 | A1* | 12/2016 | Capone ................ H04L 63/101 |

OTHER PUBLICATIONS

Technical Note TN2127: Kernel Authorization, 18 sheets [retrieved on Dec. 16, 2016], retrieved from the Internet: https://developer.apple.com/library/content/technotes/tn2127/_index.html.

* cited by examiner

*Primary Examiner* — Thanhnga B Truong
(74) *Attorney, Agent, or Firm* — Okamoto & Benedicto LLP

(57) ABSTRACT

Interprocess communication between processes that run on a host operating system of a computer is performed by way of a protected temporary file. File access operation on the temporary file is hooked to detect writing to the temporary file. When a process writes a message to the temporary file, a verification is performed to determine whether or not the process is authorized to access the temporary file. When the process is authorized to access the temporary file, the process is allowed to write the message to the temporary file. This allows another process that is intended to receive the message to read the message from the temporary file and act on the message. Otherwise, when the process is not authorized to access the temporary file, the process is blocked from writing the message to the temporary file.

8 Claims, 4 Drawing Sheets

PROTECTION OF INTERPROCESS COMMUNICATIONS IN A COMPUTER

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

1. Field of the Invention

The present invention relates generally to computer security, and more particularly but not exclusively to systems and method for interprocess communications.

2. Description of the Background Art

A process is a running instance of a computer program in main memory. Generally speaking, most operating systems provide mechanisms for interprocess communication (IPC) to allow processes to communicate with one another, such as to pass data and other information. Unlike network communication between processes running on different operating systems on separate computers, interprocess communication is between processes running on the same host operating system on the same computer. UNIX operating system-based operating systems, such as the MAC OS X operating system, allow for interprocess communication using a UNIX domain socket. However, in the case of later versions of the MAC OS X operating system, UNIX domain socket hooking has been disabled, making it difficult if not impossible to perform secure interprocess communication using the UNIX domain socket.

SUMMARY

Interprocess communication between processes that run on a host operating system of a computer is performed by way of a protected temporary file. File access operation on the temporary file is hooked to detect writing to the temporary file. When a process writes a message to the temporary file, a verification is performed to determine whether or not the process is authorized to access the temporary file. When the process is authorized to access the temporary file, the process is allowed to write the message to the temporary file. This allows another process that is intended to receive the message to read the message from the temporary file and act on the message. Otherwise, when the process is not authorized to access the temporary file, the process is blocked from writing the message to the temporary file.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
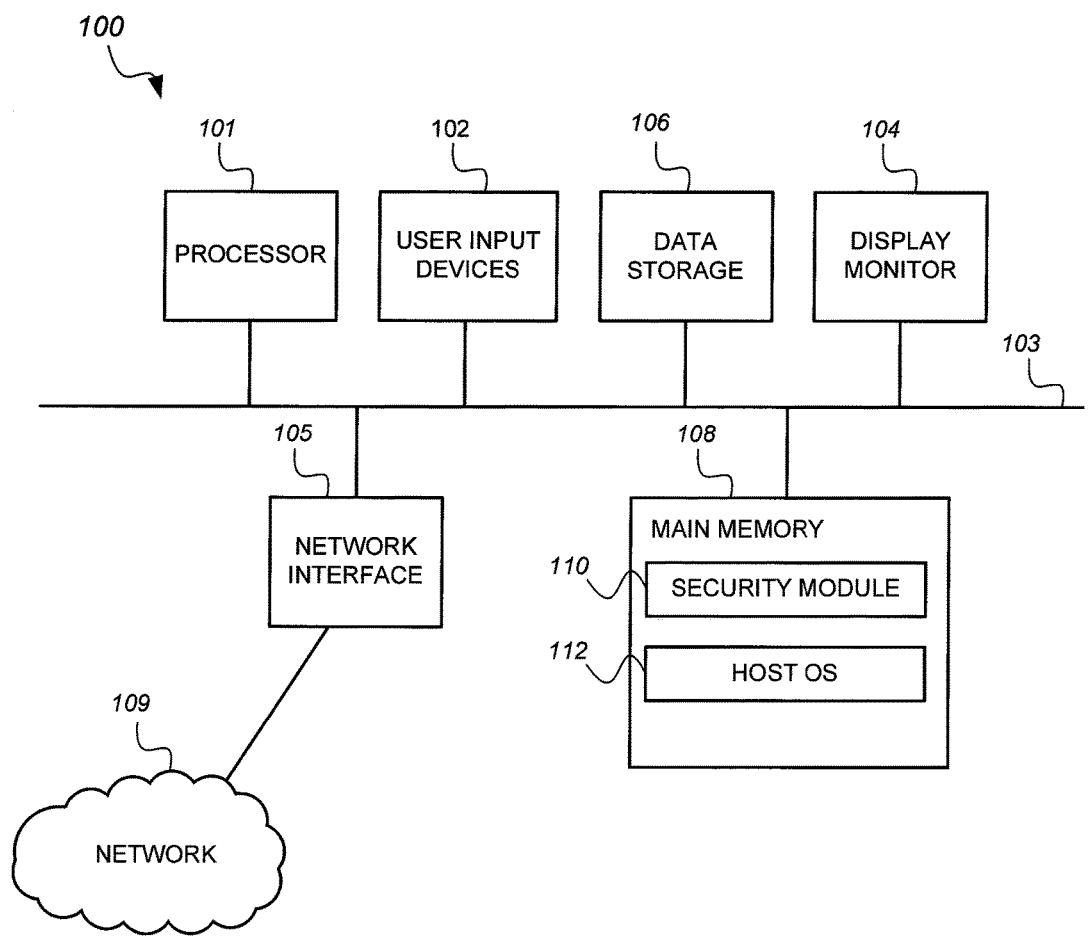
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with one or more software modules, comprising computer instructions stored non-transitory in the main memory 108 for execution by the processor 101 to cause the computer 100 to perform corresponding programmed steps. An article of manufacture may be embodied as computer-readable storage medium including instructions that when executed by the processor 101 cause the computer 100 to be operable to perform the functions of the one or more software modules.

In the example of FIG. 1, the software modules comprise a host operating system 112, a security module 110, and other programs. In one embodiment, the host operating system 112 is a MAC OS X operating system, e.g., MAC OS X ver. 10.11 or later operating system. In one embodiment, the security module 110 is configured to provide computer security services, such as antivirus, web threat protection, etc. in the computer 100. As will be more apparent below, the security module 110 may include one or more sub-modules for protecting interprocess communications between processes of the security module 110.

Figure 2:
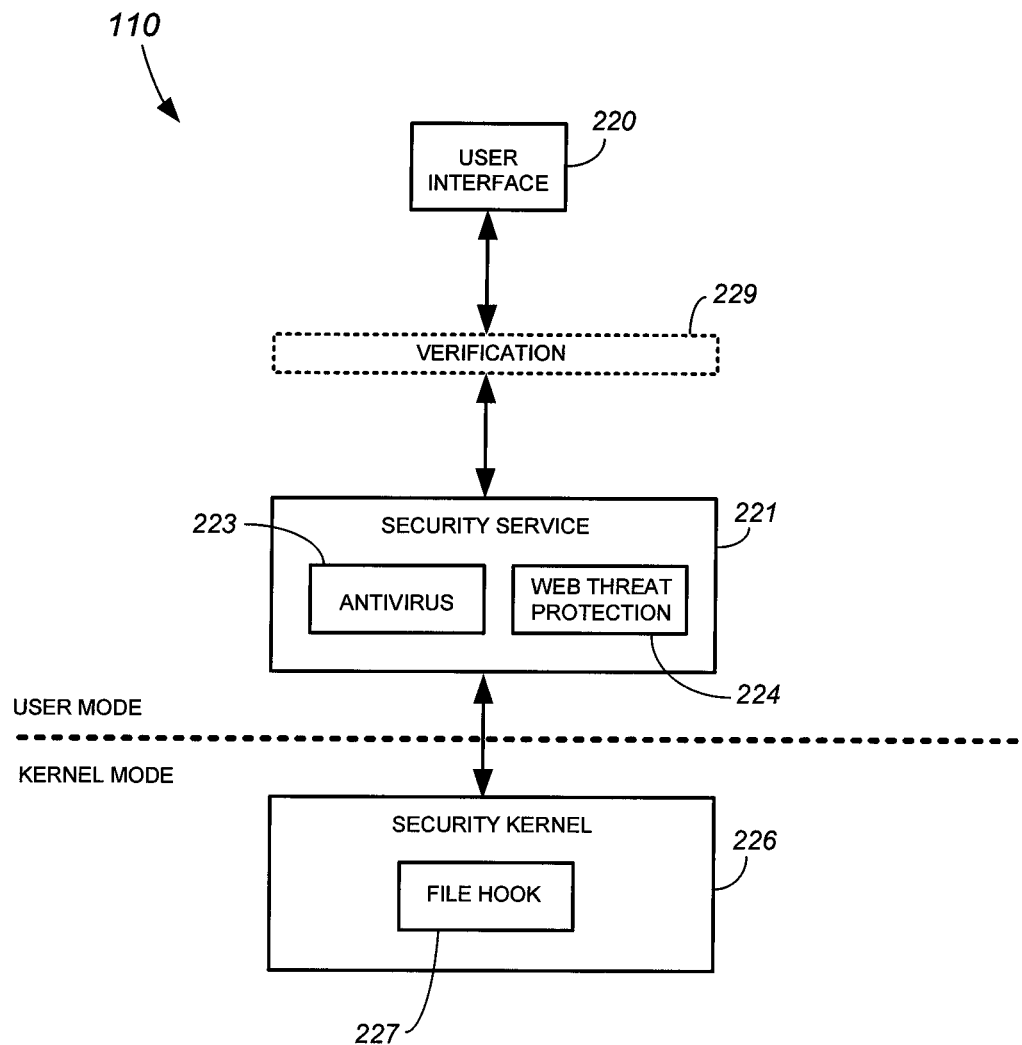
FIG. 2 shows a logical diagram of a security module in accordance with an embodiment of the present invention.

FIG. 2 shows a logical diagram of the security module 110 in accordance with an embodiment of the present invention. In the example of FIG. 2, the security module 110 comprises a user interface 220, a security service 221, and a security kernel 226. Components that are not necessary to the understanding of the invention are not shown for clarity of illustration. The security module 110 may have fewer or more components to meet the needs of a particular application.

As its name implies, the user interface 220 is configured to provide a user interface, such as a graphical user interface (GUI), to allow the user to interact with the security service 221, such as to configure the security service 221 to perform computer security service including when to perform antivirus scanning, when to receive updates, which particular websites to block or allow, etc. The user interface 220 may have client code that works in conjunction with server code of the security service 221.

In one embodiment, the security service 221 provides antivirus (see 223), web threat protection (see 224), and other computer security services in the computer 100. The general functionality of the user interface 220 and the security service 221 may be the same as that provided by, for example, the TREND MICRO ANTIVIRUS FOR MAC security software, which is commercially available from TREND MICRO, INC.

The user interface 220 may perform messaging with the security service 221 for coordination and to allow the security service 221 to receive user inputs from the user interface 220. More particularly, the process of the user interface 220 communicates with the process of the security service 221. The interprocess communication between the user interface 220 and the security service 221 needs to be secure; otherwise, malicious code may hijack the interprocess communication and compromise the security module 110.

In one embodiment, interprocess communication between the user interface 220 and the security service 221 is performed by way of a protected temporary file. The user interface 220 may write messages in the temporary file, which is then read by the security service 221. To secure the interprocess communication, a process that attempts to write to the temporary file is verified to ensure that the process is authorized to communicate with the security service 221 (see block 229). If the process that attempts to write to the temporary file is not authorized, the process may be blocked from writing to the temporary file. Otherwise, if the process is authorized, i.e., the process is that of the user interface 220 in the example of FIG. 2, the process is allowed to write to the temporary file and the security service 221 is accordingly notified that the temporary file contains a message for the security service 221. The process verification may be performed by a component of the security kernel 226, such as a file hook 227, for example.

In one embodiment, the user interface 220 and the security service 221 operates in user mode and the security kernel 226 operates in kernel mode. The security kernel 226 may include the file hook 227. The file hook 227 may be configured to hook, i.e., monitor and detect, access to the temporary file. The file hook 227 may register with the operating system 112 to hook file operations involving the temporary file. In one embodiment, the file hook 227 is implemented using the Kernel Authorization (KAUTH) kernel subsystem of the MAC OS X operating system. When the file hook 227 detects that a process accesses the temporary file, the file hook 227 verifies the process and allows or blocks access to the temporary file depending on whether or not the process is authorized to communicate with the security service 221. The file hook 227 may check the digital signature of the process, such as the signature of the binary file of the process, to determine whether or not the process is authorized. More particularly, for verification, the file hook 227 may compare the digital signature of the process accessing the temporary file against authorized digital signatures, i.e., digital signature of the process of the user interface 220 and other authorized processes. If the process is authorized to access the temporary file, the file hook 227 allows the process to access the temporary file (e.g., write a message to the temporary file) and informs the security service 221 that there is a new message in the temporary file. Otherwise, when the process is not authorized to access the temporary file, the file hook 227 blocks the process from accessing the temporary file.

In one embodiment, the file hook 227 registers a kauth_scope_callback callback from the MAC OS X operating system (host operating system 112). When the temporary file is accessed, the operating system will call the registered callback to notify the file hook 227 of the file event, and then the file hook 227 will put the file event in the queue. The security service 221 uses the "ioctl" function to communicate with the security kernel 226. If there is no file event from the security kernel 226, it will always in and non-return within ioctl in kernel. If a new file event has occurred (accessing the temp file in this example), the ioctl function will get the file event from queue and return, and then User-Mode can get the current file event to perform the check.

Figure 3:
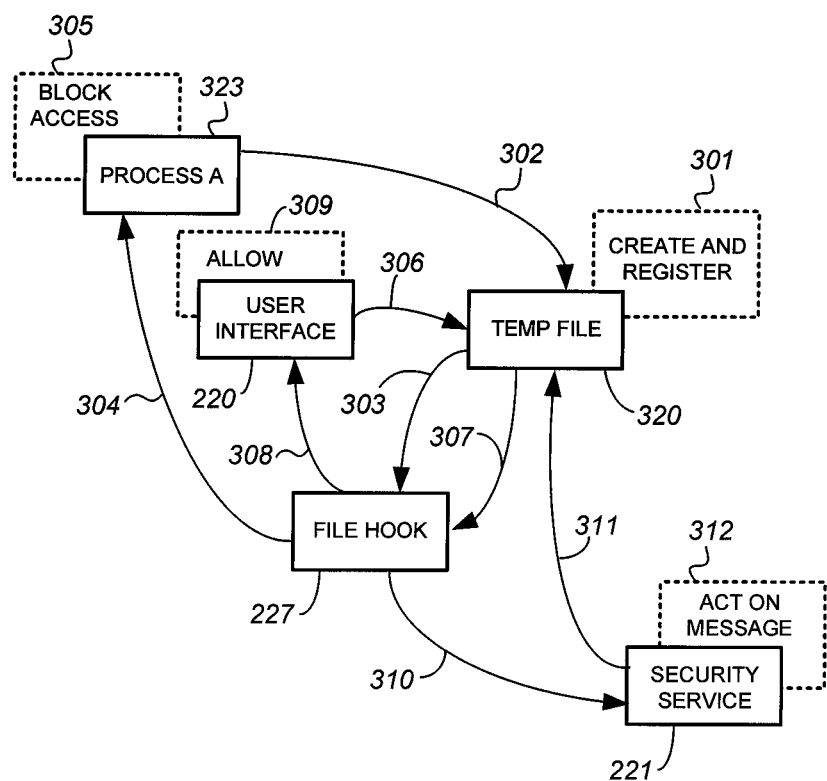
FIG. 3 shows a flow diagram of a method of interprocess communication in accordance with an embodiment of the present invention.

FIG. 3 shows a flow diagram of a method of interprocess communication in accordance with an embodiment of the present invention. The method of FIG. 3 is for interprocess communication in that the communicating processes are hosted on the same computer 100 and are running on a same host operating system 112.

In the example of FIG. 3, the file hook 227 (or another component of the security module 110) creates a temporary file 320 and registers the temporary file 320 with the kernel subsystem of the host operating system 112 for hooking (see step 301). APPENDIX A at the end of this disclosure shows an example source code for creating the temporary file. The example source code of APPENDIX A creates a socket file, which is used as the temporary file. The user interface 220 may use the send( ) function to write to the temporary file. The security service 221 is notified when new information, which is an IPC message in this example, is written to temporary file. Other ways of creating and accessing the temporary file 320 may also be employed without detracting from the merits of the present invention.

In the example of FIG. 3, a process 323 attempts to write to the temporary file 320 (see arrow 302). The file hook 227 gets a notification that the process 323 is writing to the temporary file 320 (see arrow 303). In response, the file hook 227 performs a verification of whether or not the process 323 is authorized to access the temporary file 320 (see arrow 304). For example, the file hook 227 may check the digital signature of the process 323 for verification. In the example of FIG. 3, the process 323, based on its digital signature, is not authorized to access the temporary file 320. Accordingly, the file hook 227 blocks the process 323 from writing to the temporary file 220 (see step 305).

Continuing the example of FIG. 3, the user interface 220 sends a message to the security service 221 by writing the message to the temporary file 320 (see arrow 306). The message may indicate a preference, configuration information, command, etc. that the user entered into the user interface 220. The message may have the following format, for example:

<95>%^H^G^P^B^<85><81><86>^A"$9E8FBB2D-695B-BE41-5BB4ã$S with the following corresponding data structure, {
_cached_size_=4757
cputype_=7
filetype_=2
flags_=2195589
uuid_="9E8FBB2D-695B-BE41-5BB4"
moreinfo_=0
dylib_=0x004076c0

_has_bits_=([0]=47)
}

The message format may vary depending on implementation details. The file hook 227 gets a notification from the kernel subsystem of the host operating system 112 when the user interface 220 attempts to write the message into the temporary file 320 (see arrow 307). In response, the file hook 227 performs a verification of the user interface 220 (see arrow 308). More particularly, the file hook 227 may compare the digital signature of the user interface 220 against digital signatures of authorized processes. Because the digital signature of the user interface 220 is that of an authorized process, the file hook 227 allows the user interface 220 to write to the temporary file 320 (see step 309). The file hook 227, or another component, may also inform the security service 221 that there is new information in the temporary file 320 (see arrow 310). Accordingly, the security service 221 reads the message from the temporary file 320 (see arrow 311) and acts on the message (see step 312). More particularly, the security service 221 may operate in accordance with the message.

Figure 4:
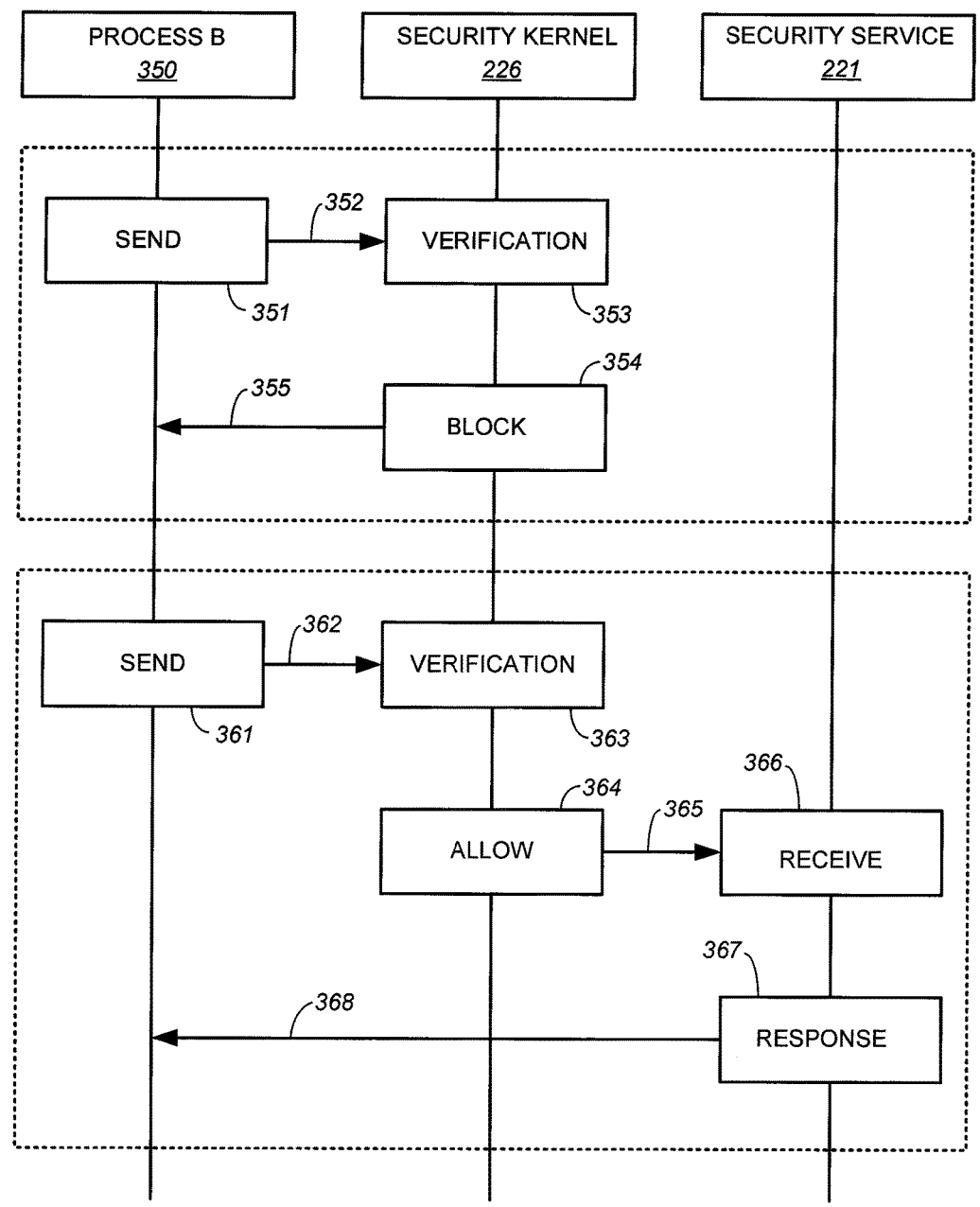
FIG. 4 shows a call diagram of interprocess communication in accordance with an embodiment of the present invention.

FIG. 4 shows a call diagram of interprocess communication in accordance with an embodiment of the present invention. In the example of FIG. 4, the steps denoted by reference labels 351-355 are for the case when the process 350 is not authorized to access a temporary file being used to pass messages to the security service 221, and the steps denoted by reference labels 361-368 are for the case when the process 350 is authorized to access the temporary file.

In the example of FIG. 4, the process 350 sends a message to the security service 221 by writing the message to the temporary file (see step 351). The security kernel 226 (e.g., the file hook 227 of the security kernel 226) receives notification that the temporary file is being accessed by the process 350 (see arrow 352). In response, the security kernel 226 performs a verification to determine whether or not the process 350 is authorized to access the temporary file (see step 353). When the process 350 is not authorized to access the temporary file, the security kernel 226 blocks the process 350 from writing the message to the temporary file (see step 354). In that case, the security kernel 226 may send an error message (e.g., EACCESS; permission denied) or other message to the process 350 (see arrow 355).

In the case where the process 350 is authorized to access the temporary file, such as when the process 350 is the user interface 220 of the security module 110, the process 350 may send a message to the security service 221 by writing the message to the temporary file (see step 361). The security kernel 226 (e.g., the file hook 227 of the security kernel 226) receives notification that the temporary file is being accessed by the process 350 (see arrow 362). In response, the security kernel 226 performs a verification to determine whether or not the process 350 is authorized to access the temporary file (see step 363). Because the process 350 is authorized to access the temporary file in this case, the security kernel 226 allows the process 350 to write the message to the temporary file (see step 364) and the security service 221 gets notified that the temporary file has a new message (see arrow 365). The security service 221 reads the temporary file to receive the message from the process 350 (see step 366) and responds to the message (see step 367). The security service 221 may respond to the message by operating in accordance with the message (see arrow 368), such as by performing an antivirus operation as indicated in the message (e.g., scan a file for malicious code), performing antivirus operations according to a schedule indicated in the message, allowing or blocking navigation to particular websites indicated in the message, etc.

Systems and method for secure interprocess communication have been disclosed. While specific embodiments of the present invention have been provided, it is to be understood that these embodiments are for illustration purposes and not limiting. Many additional embodiments will be apparent to persons of ordinary skill in the art reading this disclosure.

APPENDIX A

Copyright (C) 2016. Trend Micro, Inc.
```
int sock=socket(AF_UNIX, SOCK_STREAM, 0);
if (sock <0) {
    int myerrno=errno;
    TmError("socket fail: % d % s", myerrno, strerror(myerrno));
    return sock;
}
int on=1;
int ret=setsockopt(sock, SOL_SOCKET, SO_REUSEADDR, &on, sizeof(on));
if (ret <0) {
    int myerrno=errno;
    TmError("setsockopt fail(% d): % d % s", ret, myerrno, strerror(myerrno));
    ::close(sock);
    return ret;
}
structsockaddr_un addr={ };
addr.sun_family=AF_UNIX;
snprintf(addr.sun_path, sizeof(addr.sun_path)-1, "%s/port.% s", "/tmp", node);
unlink(addr.sun_path);
if ((ret=bind(sock, (structsockaddr*)&addr, SUN_LEN(&addr)))<0) {
    int myerrno=errno;
    TmError("bind fail(% d): % d % s", ret, myerrno, strerror(myerrno));
    ::close(sock);
    return ret;
}
chmod(addr.sun_path, 0x777);
if ((ret=::listen(sock, SOMAXCONN))<0) {
    int myerrno=errno;
    TmError("listen fail(% d): % d % s", ret, myerrno, strerror(myerrno));
    ::close(sock);
    return ret;
}
```

What is claimed is:

1. A method of performing interprocess communication in a computer that comprises a processor and memory, the method comprising:

generating a temporary file;

detecting that a process of a user interface is sending an interprocess communication (IPC) message to a process of a security service by writing the IPC message to the temporary file, wherein the process of the user interface and the process of the security service run on a same host operating system on in the memory of the computer;

in response to detecting that the process of the user interface is writing the IPC message to the temporary file, performing a verification to determine whether or not the process of the user interface is authorized to access the temporary file; and when the process of the user interface is verified to be authorized to access the temporary file, allowing the process of the user interface to write the IPC message to the temporary file, notifying the process of the security service that the temporary file has the IPC message, the process of the security service reading the IPC message from the temporary file and operating the security service in accordance with the IPC message, wherein operating the security service in accordance with the IPC message comprises performing an antivirus operation by scanning a file for malicious code in accordance with the IPC message.

2. The method of claim 1, wherein performing the verification to determine whether or not the process of the user interface is authorized to access the temporary file comprises:

comparing a digital signature of the user interface against authorized digital signatures.

3. The method of claim 2, wherein the digital signature of the user interface comprises a signature of a binary file of the user interface.

4. The method of claim 1, further comprising:

when the process of the user interface is not verified to be authorized to access the temporary file, blocking the process of the user interface from writing the IPC message to the temporary file.

5. A computer comprising a processor and a memory, the memory comprising instructions that when executed by the processor cause the computer to perform the steps of:

running a first process and a second process on a same host operating system in the memory of the computer, the first process being a process of a user interface and the second process being a process of a security service;

detecting that the first process is writing an interprocess communication (IPC) message to a temporary file;

performing a verification to determine whether or not the first process is authorized to access the temporary file; and when the first process is verified to be authorized to access the temporary file, allowing the first process to write the IPC message to the temporary file, notifying the second process that the temporary file has the IPC message, the second process reading the IPC message from the temporary file, and the security service performing an antivirus operation in the computer in accordance with the IPC message.

6. The computer of claim 5, wherein the instructions when executed by the processor cause the computer to further perform the steps of:

when the first process is not authorized to access the temporary file, blocking the first process from writing the IPC message to the temporary file.

7. The computer of claim 5, wherein performing the verification to determine whether or not the first process is authorized to access the temporary file comprises:

comparing a signature of a binary file of the first process against authorized signatures.

8. A method of interprocess communication (IPC) between a first process of a user interface and a second process of a security service that run on a same host operating system in a memory of a computer, the method comprising:

hooking file access operations on a file to detect writing to the file;

detecting that the first process is sending an IPC message to the second process by writing the IPC message to the file;

in response to detecting that the first process is writing the IPC message to the file, comparing a digital signature of the first process against authorized digital signatures; and when the digital signature of the first process indicates that the first process is authorized to access the file, allowing the first process to write the IPC message to the file, the second process reading the IPC message from the file, and the second process acting on the message by scanning a particular file in the computer for malicious code.

* * * * *

UNITED STATES PATENT AND TRADEMARK OFFICE
CERTIFICATE OF CORRECTION

PATENT NO. : 10,354,081 B1
APPLICATION NO. : 15/398969
DATED : July 16, 2019
INVENTOR(S) : Jiang et al.

Page 1 of 1

It is certified that error appears in the above-identified patent and that said Letters Patent is hereby corrected as shown below:

In the Claims

Claim 1, Column 6, Line 63, between "operating system" and "in the memory of the", delete "on"

Signed and Sealed this
Thirty-first Day of March, 2020

Andrei Iancu
*Director of the United States Patent and Trademark Office*